United States Patent [19]
Hess

[11] 3,910,144
[45] Oct. 7, 1975

[54] BOTTLE TOP CUTTER
[75] Inventor: Harold S. Hess, Irvine, Calif.
[73] Assignee: Baxter Laboratories, Inc., Morton Grove, Ill.
[22] Filed: Feb. 20, 1974
[21] Appl. No.: 444,068

[52] U.S. Cl. .................. 83/440.1; 83/588; 83/632; 83/633; 83/694; 83/701; 83/925 R
[51] Int. Cl.² .................. B23D 23/00; B23D 15/04
[58] Field of Search ............ 83/694, 914, 701, 632, 83/633, 588, 925 R, 440, 449, 438, 444, 451, 466.1; 30/2, 5; 53/381 R, 381 A, 384

[56] References Cited
UNITED STATES PATENTS

| | | | |
|---|---|---|---|
| 1,347,289 | 7/1920 | Parent | 83/632 |
| 1,347,912 | 7/1920 | Richardson | 83/632 X |
| 1,488,562 | 4/1924 | Spaulding | 83/627 |
| 1,692,764 | 11/1928 | Salt | 83/588 X |
| 3,748,936 | 7/1973 | Minasy | 83/694 X |
| 3,757,622 | 9/1973 | Berry | 53/381 R |

Primary Examiner—J. M. Meister
Attorney, Agent, or Firm—Scott J. Meyer; Louis Altman

[57] ABSTRACT

There is disclosed herein a bottle top cutter adapted and constructed to be utilized to cleanly horizontally sever the neck portion and above of a thermoplastic bottle which may contain a liquid. The apparatus is especially designed to sever a thermoplastic bottle which has a neck portion previously heat sealed into flat confrontation surfaces over a relatively narrow band area which is horizontally disposed or transverse to the longitudinal axis of the thermoplastic bottle. The apparatus comprises a holder for the cutting means and may possess aligning means for the bottle whereby the said heat sealed neck portion is in relative abutment to a fixed stationary means. The device possesses a movable blade which is positioned to move horizontally through suitable mechanical manually operated linkage means. The said manually operated linkage means is designed to move the blade horizontally in the direction of the stationary means whereby the thermoplastic bottle is severed in the said manner.

6 Claims, 9 Drawing Figures

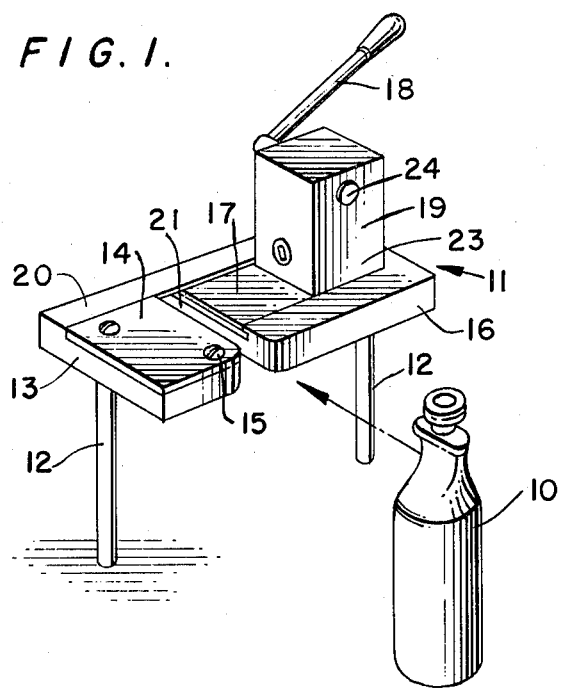
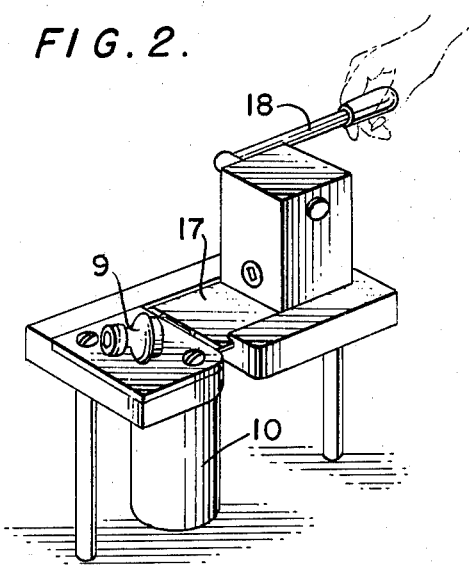
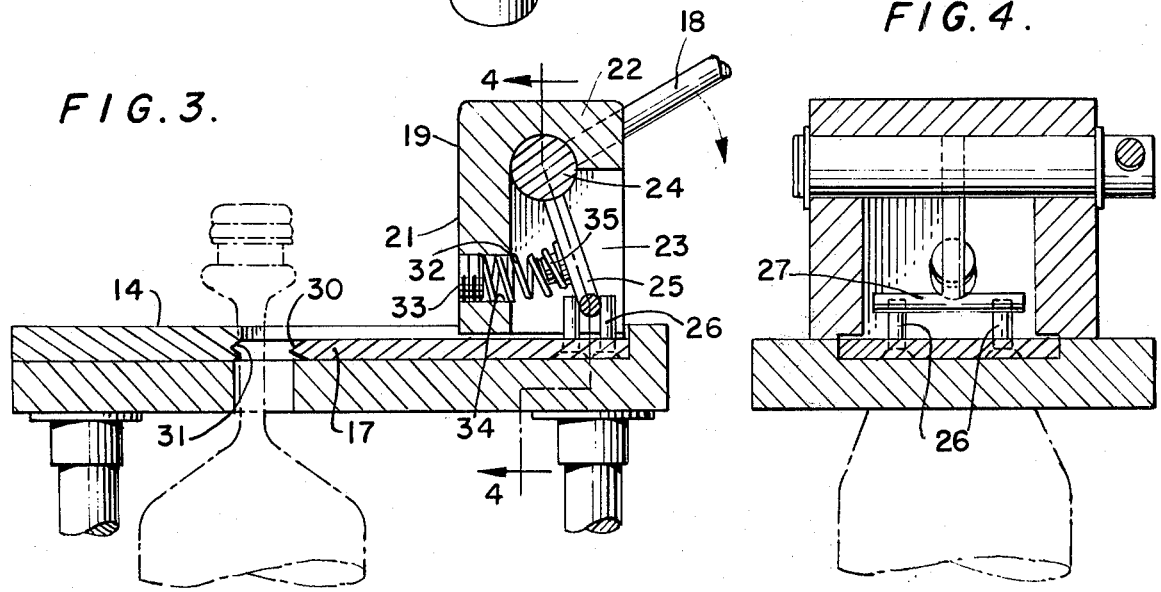
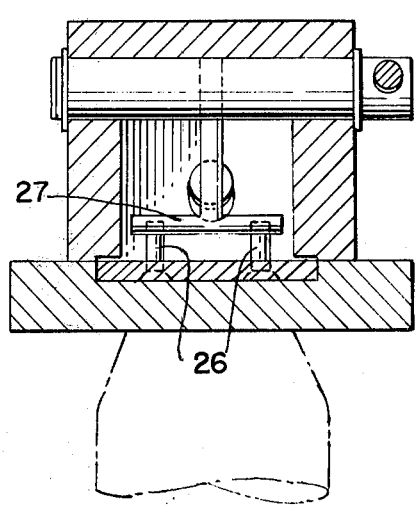
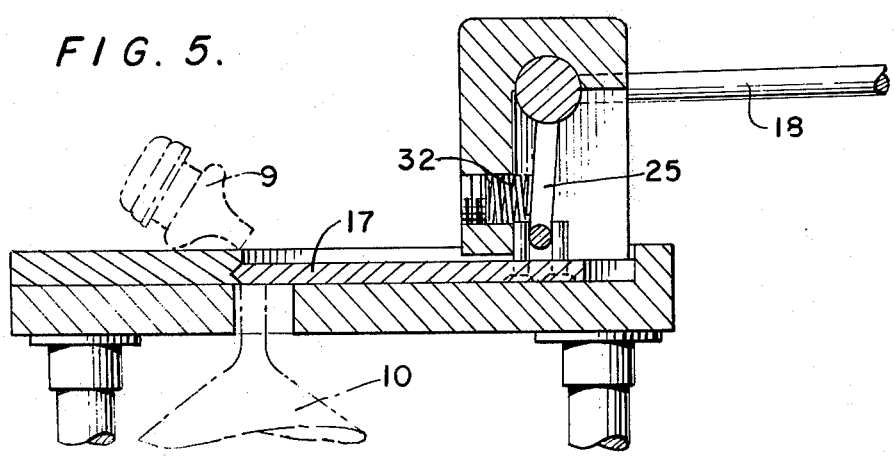

FIG.6.
FIG.7.
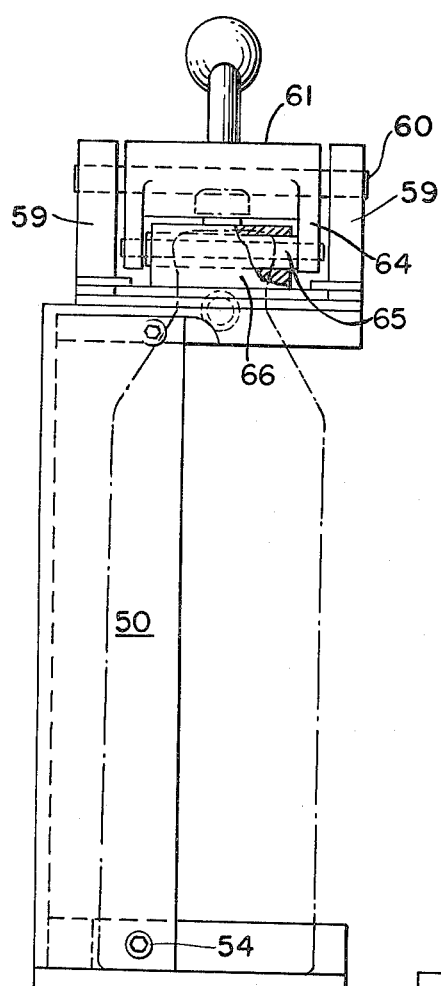
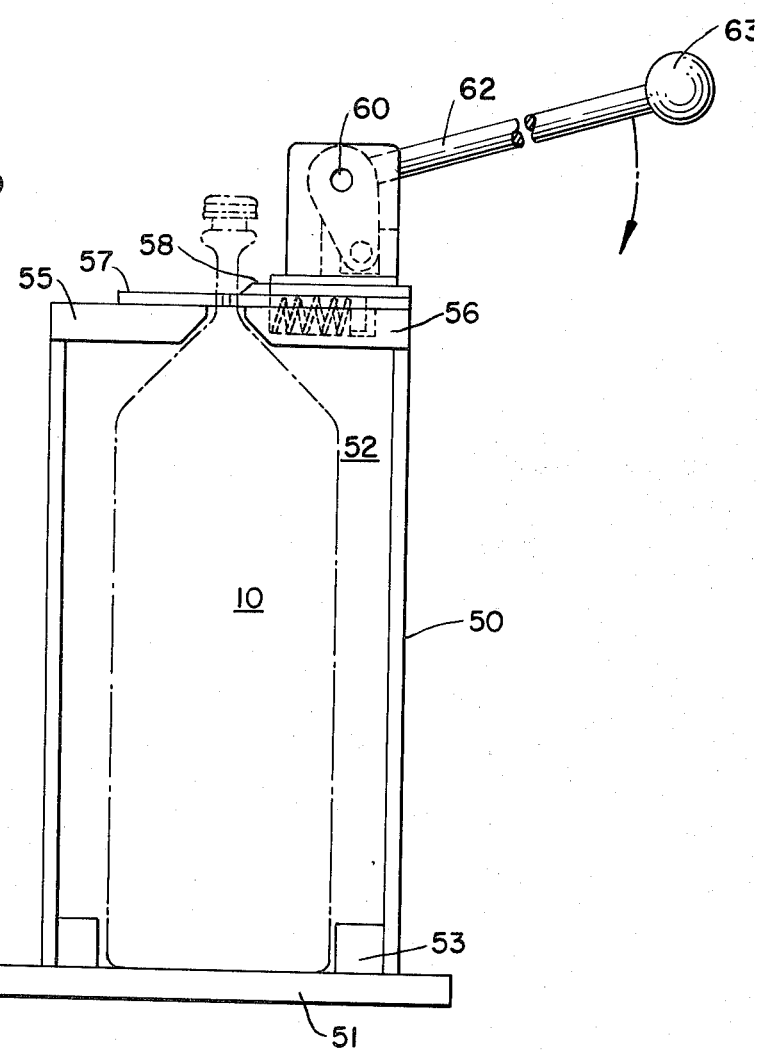
FIG.8.
FIG.9.
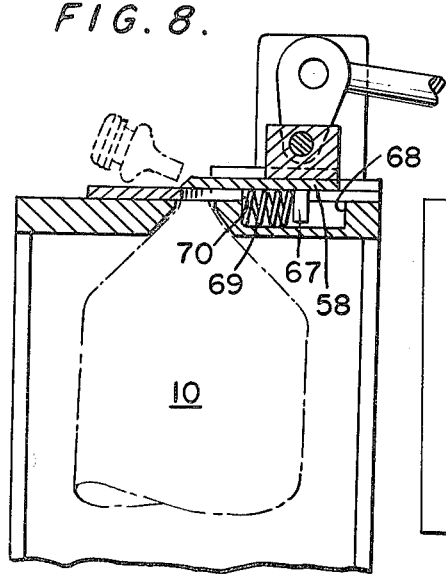
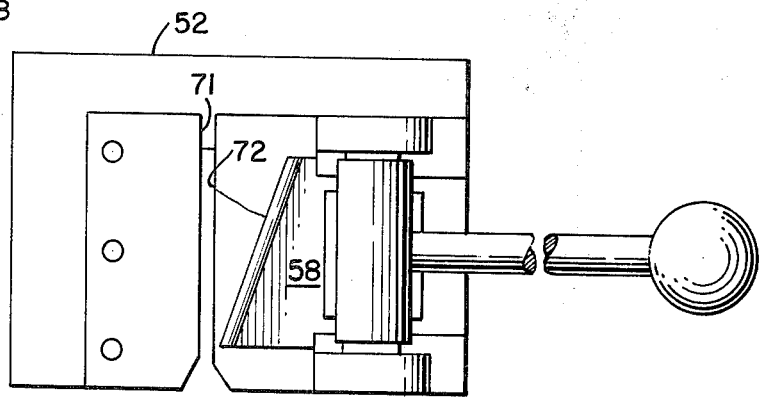

BOTTLE TOP CUTTER

BACKGROUND OF THE INVENTION

The concept of blow molding and heat sealing thermoplastic bottles has become an important adjunct in medical technology. Specifically, U.S. Pat. Nos. 3,597,793; 3,730,372; and Re. 27,155; and British Pat. No. 1,318,030, are of interest with respect to this concept. Such blow molded thermoplastic bottles have found utilization and great commercial acceptance due to the fact that they may be blow molded and filled, if desired, all in a microbe free environment.

With respect to such utilization, efforts have now been directed to employing such thermoplastic blow molded bottles in plasma collection systems. In other words, blood obtained from a donor is suitably centrifuged to separate the plasma component from the blood cells. The blood cells are then returned to the donor while the plasma is utilized in a conventional manner. However, the plasma must be stored until utilization in a container and each quantity of plasma must be stored until utilization in a container and each quantity of plasma from a single donor must be maintained in its individual container.

Of recent vintage has been the concept of providing a blow molded thermoplastic bottle having a pierceable membrane wherein the neck portion thereof is flattened so that two opposing spaced walls are formed. The neck terminates at the top in a pierceable membrane through which the plasma is charged into the bottle. After filling the bottle, the neck is further compressed by a heat sealing means whereby the two walls become heat sealed over a horizontally disposed narrow band.

The thermoplastic bottles, after being filled in the manner aforementioned, are placed into cardboard boxes. It has been found propitious in order to conserve space to remove the top portion of the bottle. Accordingly, the top portion of the bottle is severed by cutting the thermoplastic bottle through the heat sealed band. In this manner, the bottle continues to be in a sealed condition due to the fact that there is a remaining portion which continues to be in a heat sealed condition.

SUMMARY OF THE INVENTION

The present invention relates to an apparatus for severing the top portion of a thermoplastic bottle. In one embodiment a stand is provided into which the thermoplastic bottle may be inserted. The thermoplastic bottle to be severed has a constricted neck portion which is heat sealed in a manner whereby the walls thereof are compressed and heat sealed into a relatively narrow flat band. The stand is constructed in a U-shaped configuration whereby, when the bottle is inserted, the said heat sealed portion of the neck is at one side positioned opposite a stationary blade in one embodiment, or an anvil in another embodiment. On the other side of the thermoplastic portion is positioned a movable sharpened blade which is adapted and constructed to be thrust horizontally in the direction of the heat sealed band area towards the stationary blade or the anvil. When a stationary blade is employed, the movable blade is vertically displaced so that after it passes through the thermoplastic bottle heat sealed band area it slides over the top surface of the stationary blade. In the embodiment employing an anvil, the blade operates whereby it is thrust directly into a mating accepting groove horizontally disposed along the surface of the anvil in confrontation with the thermoplastic heat sealed band area. The blade is moved horizontally through the aegis of a spring loaded lever mechanical linkage means. The said lever is moved downwardly through an arc by manual operation.

DESCRIPTION OF THE DRAWINGS

FIG. 1 is a perspective view of one embodiment of the cutter of the present invention showing the movement of a thermoplastic bottle into the confines of the cutting area.

FIG. 2 is a similar view as in FIG. 1 illustrating the utilization of the cutter of the present invention on a thermoplastic bottle.

FIG. 3 is a cross-sectional view of the cutter of the present invention showing the beginning operation thereof.

FIG. 4 is a cross-sectional view taken along lines 4—4 of FIG. 3.

FIG. 5 is a cross-sectional view similar to that shown in FIG. 3 illustrating the conclusion of the operation of the cutter of the present invention.

FIG. 6 is a side view of another embodiment of the cutter of the present invention.

FIG. 7 is a front elevation of said other embodiment of the present invention.

FIG. 8 illustrates the utilization of the cutter of said other embodiment.

FIG. 9 is a top plan view of the cutter of said other embodiment of the present invention.

DETAILED DESCRIPTION OF THE DRAWINGS

Turning now to FIGS. 1–5 for a detailed consideration of one embodiment of the present invention, attention is directed to FIG. 1, for instance, wherein reference numeral 11 illustrates, generally, the cutter. The cutter is mounted on vertical standards 12. The standards 12 can be secured to an acceptable base or to a table (not shown). In general, the cutter presents a horizontal U-shaped configuration wherein leg 13 has secured thereon a stationary anvil 14 which can be affixed to leg 13 by means of suitable screws 15 or the like. The other leg 16 has mounted thereon a movable blade 17 operated through manual lever 18 and suitable linkage means in housing 19. Legs 13 and 16 are joined by portion 20. It will be noted from FIG. 1 that a thermoplastic bottle 10 is about to be positioned in the zone 21 defined between the stationary anvil 14 and the moving blade 17.

From FIG. 2 it will be noted that the top portion 9 of thermoplastic bottle 10 has been severed therefrom by manual manipulation of lever 18 as shown by the hand in dotted lines. Additionally, it will be seen that blade 17 has been moved horizontally in the direction of the stationary anvil 14.

In order to obtain a more definitive view of the cutter of the present invention and its operating means, attention is now directed to FIGS. 3–5. It will be seen that housing 19 consists of a forward wall 21 and a top wall 22. It also possesses side walls 23 and is open at the outwardly extending side. Lever 18 is fixedly connected at one end of axle 24 which extends through the housing 19 and is journalled in walls 23 along a horizontal axis. Axle 24 has a downwardly depending member 25. Blade 17 has positioned at the top surface thereof near the end opposite its cutting edge an upstanding pair of two stubs 26. Member 25 terminates in a horizontally disposed rod 27 whereby member 25 and rod 27 describe a T-shaped configuration. The rod 27 is disposed within the pair of upstanding stubs 26. When lever 18 is rotated through a small arc, as shown by the dotted line and arrow in FIG. 3, axle 24 moves in concurrence therewith also thereby moving through the same angle member 25. As rod 27 is affixed to member 25, one side of rod 27 will move against two of the upstanding stubs on the side of the cutting edge pushing the blade 17 horizontally in a direction towards the stationary anvil 14. From FIG. 3 it will be clearly seen that the thermoplastic bottle 10 shown in dotted lines will be severed as the cutting edge 30 of blade 17 is driven towards groove 31 of the stationary anvil 14. The blade 17 may be returned to its inoperative position by raising lever 18 to present the view shown in FIG. 3. However, to ensure the rapid return of blade 17 to its normal position, the mechanical linkage means can be spring loaded. With respect thereto, attention is directed to the use of a helical spring 32 which is in abutment with a plug 33 positioned in a bore 34 in the lower portion of end wall 21 and has its other end in abutment with one side of member 25. The spring is retained in position on member 25 by virtue of a perpendicularly disposed stub 35.

From FIG. 5 one will garner elucidation with respect to the full operation of the device wherein the top portion 9 has indeed been severed from the thermoplastic bottle 10. It will be appreciated from FIG. 5 due to the arrangement of the mechanical components and moving parts that upon the release of lever 18 spring 32 will urge lever 18 to its more vertical position and thereby at the same time return blade 17 to its normal position as exemplified in FIGS. 1 and 3.

Attention is now directed to FIGS. 6-9 for a consideration of another embodiment of the present invention. Particularly, it will be noted from FIGS. 6 and 7 that the device includes upright supports 50 positioned on a base 51. The supports are conencted at the back by a rear wall 52. At the bottom of the supports 50 where they make contact with the base 51, two blocks 53 are positioned as means for aligning the thermoplastic bottle 10 shown by dotted lines in the figures. The blocks 53 can be secured by means of screws 54 or the like as can be more clearly seen from FIG. 6. The supports 50 are designed to carry a plate 55 on the left support as shown in FIG. 7 and a plate 56 as shown on the right support 50 of FIG. 7. The plates are also secured by suitable means to the back wall 52. Positioned on the top surface of plate 55 is a stationary blade 57. Positioned on the top of plate 56 is a movable blade 58 which is vertically displaced so that it slides over the top surface of stationary blade 57. Mounted on plate 56 are upright members 59 adapted and constructed to have journalled near the top end portions thereof an axle 60. Axle 60 carries a bifurcated bracket 61. Bracket 61 has extending therefrom a lever 62 ending in a knob 63. The lever is designed to operate the cutting means of the present invention. Bifurcated bracket 61 has depending legs 64 which have journalled therebetween a roller 65. Mounted on the cutting blade 58 is a block 66 which has a bore horizontally therethrough adapted and constructed to accept roller 65.

Attention is now directed specifically to FIG. 8, where one can see that cutting blade 58 has a downwardly depending stop or abutment means 67 which extends vertically downwardly into recess 68 positioned in the top of plate 56. Additionally, a helical spring 69 is positioned in said recess 68 and is in abutment against one side of the abutment means 67 and against the side end wall 70 of the recess 68. In order to operate the present invention, it will be noted that a thermoplastic bottle 10 of the same type as was heretofore operated upon is positioned between blocks 53 and within the confines of the zone defined by the back 52 of the device and the edge of the stationary blade 57 identified by reference numeral 71 and the edge 72 which is the cutting edge of cutting blade 58. This can be seen more accurately from FIG. 9. The device is operated by moving lever 62 as shown in FIG. 7 through the arc denoted by the dotted line and arrow. As lever 62 is moved, the bifurcated means 61 will move cutting blade 58 horizontally in a direction towards and over blade 57 to cut off the top portion of the thermoplastic bottle as shown in FIG. 8. As will be appreciated from FIG. 8, when the cutting operation is instituted, the spring 69 is compressed between the abutment means 67 and the end wall 70 in order to produce tension. When lever 62 is released, the spring urges the cutting blade 58 back into the position shown in FIG. 7 wherein the spring is identified by dotted lines.

It will be appreciated that the materials for constructing the apparatus of the present invention can be of metal or plastic or other rigid self-supporting and self-sustaining material. The cutting blades should, of course, be sufficiently hard and sharp to effect a cutting operation and will generally require a construction material such as a metal.

While specific examples have been set forth above, it will be apparent to the person skilled in the art after reading the foregoing disclosure that various other examples can be devised without departing from the spirit and scope of the invention. All such further examples are included within the scope of the invention as defined in the appended claims.

What is claimed is:

1. An apparatus for severing the tip portion of a thermoplastic bottle along the flattened sides of the constricted neck portion of said bottle comprising at least two upright standards in spaced relationship from each other, a horizontal plate means affixed to one standard, a horizontal plate means affixed to the other standard, means for rigidly joining both said plate means and said standards, both of said plate means being in the same plane and in spaced relationship, said two plate means and said means for rigidly joining both plate means defining a space laterally enterable wherein the to-be-cut thermoplastic bottle is positioned, a movable cutting blade positioned on one of said plate means, means for moving said cutting blade towards said other plate means across said space.

2. The apparatus of claim 1 wherein manually operated mechanical linkage means is positioned on said plate means having said cutting blade and wherein said mechanical linkage means is adapted and constructed to move said cutting blade across said space.

3. The apparatus of claim 2 wherein said cutting blade is normally urged out of said space.

4. The apparatus of claim 3 wherein said manually operated mechanical linkage means includes upright means positioned on said plate means, lever means journalled between said upright means, one end of said lever being adapted and constructed to be manually operated, the other end of said lever being operatively connected to said cutting blade whereby said cutting blade is movable.

5. The apparatus of claim 4 wherein said cutting blade has a depending abutment, spring means is positioned between said abutment and means on said plate means on which said cutting blade is mounted whereby said cutting blade is spring loaded out of said space.

6. The apparatus of claim 5 wherein there is provided an aligning means between said upright standards for said bottle.

* * * * *